United States Patent

Sloane et al.

[15] 3,670,326

[45] June 13, 1972

[54] DIGITAL TO LOG-ANALOG CONVERTER

[72] Inventors: Edwin A. Sloane, Los Altos; Lee E. Scaggs, Mountain View, both of Calif.

[73] Assignee: Time/Data Corporation, Palo Alto, Calif.

[22] Filed: Nov. 23, 1970

[21] Appl. No.: 91,860

Related U.S. Application Data

[63] Continuation-in-part of Ser. No. 775,216, Sept. 3, 1968, abandoned.

[52] U.S. Cl. .......................................................340/347 DA

[51] Int. Cl. .......................................................H03k 13/04

[58] Field of Search...............340/347 DA; 235/197, 150.53, 235/154, 150.5, 193

[56] References Cited

UNITED STATES PATENTS

| | | | |
|---|---|---|---|
| 3,299,419 | 1/1967 | Kumm et al. | 340/347 DA |
| 3,223,993 | 12/1965 | Dahlberg, Jr. | 340/347 DA |
| 3,296,611 | 1/1967 | Kaneko | 340/347 DA |
| 3,553,443 | 1/1971 | Neil | 235/150.53 |

*Primary Examiner*—Maynard R. Wilbur
*Assistant Examiner*—Leo H. Boudreau
*Attorney*—Spensley, Horn and Lubitz

[57] ABSTRACT

A system for converting digital information into logarithmic (log) analog form is disclosed. The characteristic and mantissa for each converted digital work are determined separately and then summed. The characteristic and mantissa are determined utilizing a linear, resistive network.

10 Claims, 10 Drawing Figures

EDWIN A. SLOANE
LEE E. SCAGGS
INVENTOR.

BY Spensley & Horn
ATTORNEYS

EDWIN A. SLOANE
LEE E. SCAGGS
INVENTOR.

BY Spensley & Horn
ATTORNEYS

EDWIN A. SLOANE
LEE E. SCAGGS
INVENTOR.

BY
Spensley, Horn & Lubitz
ATTORNEYS

DIGITAL TO LOG-ANALOG CONVERTER

This application is a continuation-in-part of U.S. patent application Ser. No. 775,216, filed Sept. 3, 1968, and now abandoned.

BACKGROUND OF THE INVENTION

1. Field of the Invention

The invention relates to the field of digital to log-analog converters.

2. Prior Art

The increased use of digital computers in modern technology has placed new demands on the computer industry to produce an inexpensive and accurate digital to log-analog converter. While the applications for such a converter are numerous, the problems of displaying digital information in analog form presents a particularly significant application for such a converter. It is not uncommon in computer technology to utilize words of 18 bits or more. If a group of such words are to be displayed or recorded in analog form, the required dynamic range of the display or recording equipment would be beyond that of most existing equipment. Thus, to have a meaningful display, or to record in analog form the value of large digital words it is necessary to convert the words to a scale compatible with the dynamic range of existing display and recording equipment. One such scaling means is provided by the conversion of digital information to logarithmic analog form.

Several systems are presently available for converting digital information to logarithmic analog form. These include "soft-wear" programs for use in general purpose digital computers, linear digital to analog conversion means coupled with logarithmic amplifiers, and other systems utilizing non-linear devices.

There are numerous soft-wear computer programs suitable for converting digital information to a log-analog form. The performance of the conversion with the use of a digital computer has the obvious disadvantage of requiring the use of a general purpose digital computer a complex "soft-wear" program. This is a costly and inconvenient method for performing the conversion where an immediate conversion may be required.

Another of the systems for the digital to log-analog conversion consists of first converting the digital information linearly to analog form and then converting the linear-analog signal to logarithmic form. The latter conversion is accomplished using commercially available logarithmic amplifiers. An inherent problem with this system is that it requires a logarithmic amplifier with a large dynamic range, this is a dynamic range compatible with the range of the digital information. For digital words of 18 bits and more the dynamic range requirements of the amplifier make it a costly device.

A third system for converting digital information to log-analog form is that disclosed in U. S. Pat. No. 3,303,489 by Krucoff. This patent discloses a scheme for determining the mantissa of the log-analog signal by the use of a non-linear device such as a conventional diode circuit. Non-linear circuit elements have many disadvantages, including the problem of selection of circuit elements required to duplicate circuit performance. In addition, the system is a fixed point arrangement.

SUMMARY OF THE INVENTION

A system for converting digital signals into a log-analog signal wherein a digital word or signal equal in value to the characteristic of the log signal is determined in a digital decrementing counter by counting the number of bits between the most significant "one" and the last bit of an input word. This value is converted to analog form by a standard digital to analog conversion network.

The mantissa component of the analog signal is determined in a resistive network. A combination of series and parallel coupled resistors in the network are made to duplicate a logarithmic function. The characteristic and mantissa component of the analog signal are summed to form the output log-analog signal.

It is an object of this invention to provide a digital to log-analog converter which does not require non-linear circuit elements for the conversion.

It is a further object of this invention to provide a resistive network wherein the response of said network approximates a logarithmic function.

It is a further object of this invention to provide a digital to log-analog converter wherein the characteristic is automatically and separately determined.

DETAILED DESCRIPTION OF THE INVENTION

Figure 1:
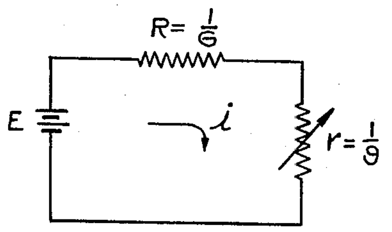
FIG. 1 is a series resistive circuit.

The present invention discloses means for converting a digital word or words to log-analog form. With the application of the digital input word to the converter, the output of the converter is a logarithmic value of the input digital word in analog form. For the purpose of this specification, it is assumed that the input word to the digital converter is a standard, positive, binary word wherein the least significant bit (or first bit) of the word represents $2^0$ and the $n^{th}$ bit of the word represents $2^{(n-1)}$. Also, a valued bit of the word is represented by one (1) and a non-valued bit by a zero (0). While the present invention may be used with digitally coded words, the present scheme has been chosen because it is commonly used in computer technology and it is most general and simple for purposes of explanation.

In a digital to log-analog converter, the base of the logarithm utilized by the converter is of no general significance insofar as the input and output performance of the converter is concerned. The significance of the choice of a base for a logarithmic converter is purely a matter involving its internal workings and details and not its output. The reason for this is that the logarithm of a number to any base is directly proportional to the logarithm of that number to any other base. Thus, if we consider the relationship between the logarithm of a number "X" for two different base values such as base $a$ and base $b$, this can be expressed mathematically as $\log_a X = (\log_b X.)/(\log_b a)$ The term $\log_b$ is a constant for any two bases and does not vary with the value of $X$. For example, the $\log_{10} X = 0.30103 \log_2 X$ and $\log_e X = 0.69315 \log_2 X$. Thus, the logarithm of the number $X$ to the base 2 is directly proportional to the logarithm of $X$ taken to the commonly used bases of $e$ and 10. Therefore, the outputs of any digital to log-analog converters vary only by a constant, even in the case where the converters use different logarithmic bases internally for the calculation of the output signal. The fact that the output levels of a converter have no absolute numerical value, further emphasizes the lack of importance of a particular base as to output and input performance. In the present invention, the converter utilizes a base of 2 and as will be seen later in this specification, this base was chosen since it allows a simplified scheme for determining the characteristic and mantissa components of the output signal. It is of course understood that the bases other than the base 2 may be employed internally consistent with the invention.

The logarithm of the number may be separated into two parts. The first of these parts is a whole number generally referred to as the characteristic. The second part is a fraction or decimal number, always less than (1), commonly called the mantissa. In the present invention, the characteristic and mantissa components of the output analog signal are separately determined and then summed. It should be noted that by choosing the base 2 the characteristic of the digital binary input word may be readily determined. Consider a digital binary word having $n$ bits. The most significant bit of the word is $2^{n-1}$. The sum of the numbers represented by all the remaining bits of the word can never exceed the value of $2^{n-1}$. Therefore, the characteristic of a digital word having n digits, to the base 2 is always $n-1$ where n is the most significant bit in the word which is a "one." For example, consider the word 001101. The most significant bit of this word which has a value is the fourth bit, thus $n$ is equal to 4. Therefore, the characteristic of this word is equal to $n-1$ or 3. Thus, by choosing a base of 2, the characteristic for any given digital word may be readily determined. The value of the characteristic, which is always a whole integer number, is equal to $n-1$ where n is the most significant bit in the word which has a value.

In the present invention, a resistive network is used to determine the value of the mantissa component of the output log-analog signal. An examination of the simple series resistive network as shown in FIG. 1 is helpful in order to understand the present invention. The circuit of FIG. 1 contains two resistors, one having a fixed conductance G, the second having a variable conductance $g$. The current $i$ through the circuit, from an application of Ohm's law is defined as:

$$i=\frac{E}{\frac{1}{G}+\frac{1}{g}}.$$

Figure 2:
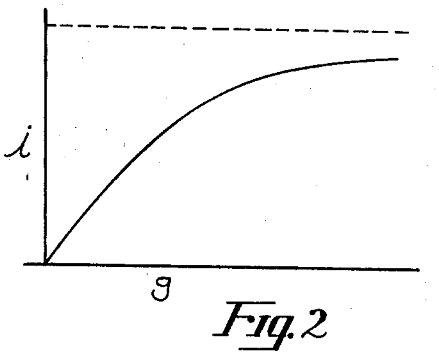
FIG. 2 is a graph of a current ($i$) versus the conductance ($g$) for the circuit of FIG. 1.

This expression can be reduced to $i=Kg/(G+g)$ where K is a constant equal to the product $EG$. As has been previously shown, the mantissa of the logarithm can never be greater than 1 and must always be greater or equal to zero. The equation for $i$ can be normalized so that $g$ may be varied between 0 and 1, thereby giving the desired output current $i$, which is representative of the mantissa. This can be accomplished by letting $K=(G+1)$. Then $i$ becomes, $i=g(G+1)/(G+g)$. FIG. 2 is a graph of the current $i$ versus the variable conductance $g$ for the equation $i=g(G+1)/(G+g)$. An examination of this shows that it bears resemblance to a graph of a logarithmic function within certain limits such as $i=\log_2(g+1)$ where $i$ is less than 1. Thus, it is possible to duplicate a non-linear function such as a logarithmic function within the specified limits, by the use of a linear network. In the present invention $g$ is varied in order to produce the appropriate current representing the mantissa of the desired logarithm.

Figure 7:
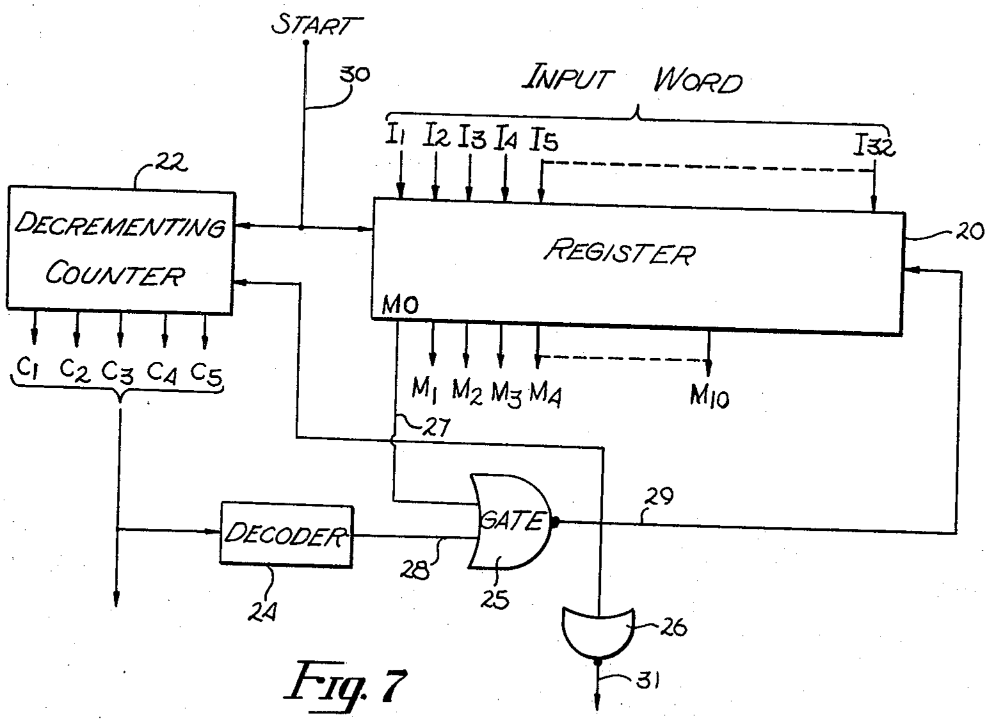
FIG. 7 is a digital section of the digital to log-analog converter.
Figure 8:
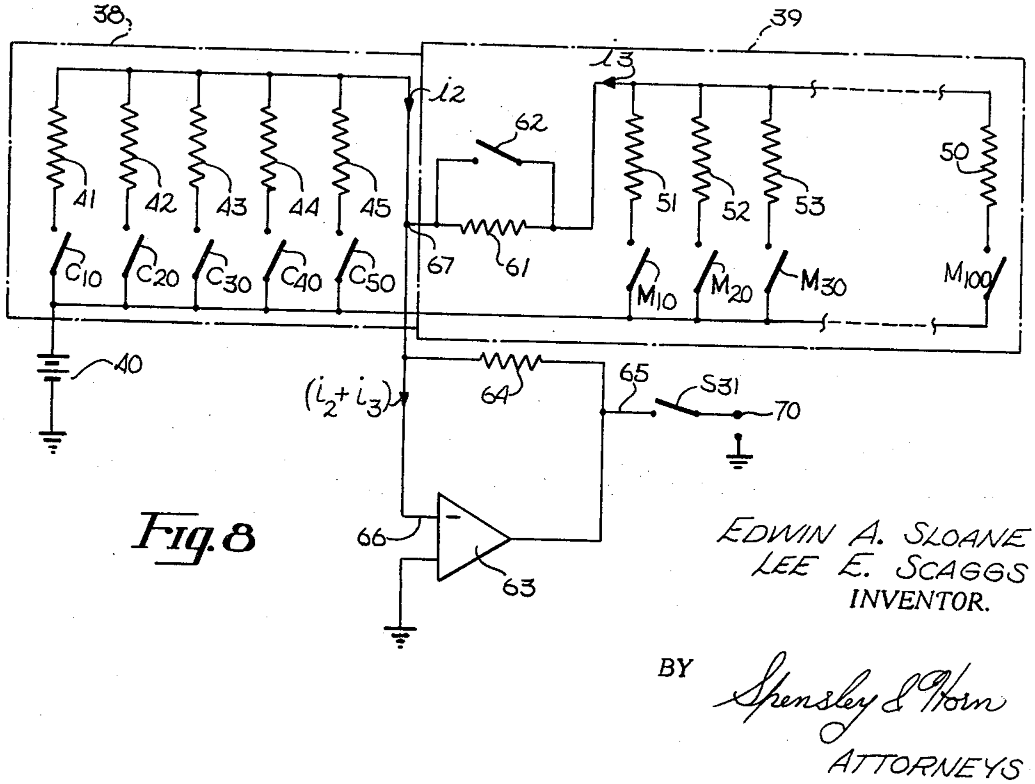
FIG. 8 is a circuit for the analog section of the digital to log-analog converter.

FIGS. 7 and 8 illustrate a schematic diagram for the digital to log-analog converter. FIG. 7 contains the input digital portion of the converter and the logic circuits for the converter, and FIG. 8 contains the analog and output portions of the converter.

Referring to FIG. 7, register 20 is a standard commercially available digital shift register. The register must be suitable for receiving an input digital word either serially or in parallel. In the present embodiment of the invention it will be assumed that a 32 bit word is shifted into register 20 as indicated by the input word designated $I_1$ through $I_{32}$. The most significant bit of the input word is designated $I_1$ and the least significant bit (corresponding to $2^0$) as $I_{32}$. Upon receipt of a signal on lead 29 register 20 shifts the word to the left, (e.g., Bit in $I_2$ moves to $I_1$, $I_3$ to $I_2$, $I_4$ to $I_3$, etc.). In the illustrated embodiment of the invention only 10 bits of the input digital signal are utilized in determining the mantissa of the output analog signal. These bits are presented on leads $M_1$ through $M_{10}$ of register 20 and are the 10 most significant bits of the input digital signal following the most significant 1 of the input digital signal. It will become apparent from the explanation contained herein that any number of output leads from register 20, for example $M_{11}$ through $M_{31}$ may be used with additional switches and resistors within dotted line 39, of FIG. 8 where a more rigorous determination of the mantissa component of the output analog signal is required. As will be seen from the description of the invention, any size register may also be utilized. The choice of a 32 bit input word and a register output of 11 bits is not intended to limit the present description.

Decrementing counter 22 is a commonly utilized digital counter. It provides a five bit output word having as its maximum count 31 and upon receipt of signals provides a digital word representative of one less than the preceding word. Assuming counter 22 indicates an output of all "ones" on the leads designated $C_1$ through $C_5$, this output would indicate the maximum count of 31. The minimum count from counter 22 would be indicated by all "zeros" on leads $C_1$ to $C_5$ and would indicate a 0 output from counter 22.

Decoder 24 is a standard digital decoding circuit and is used to produce a signal on lead 28 when the output from counter 22 is numerically equal to 0. Decoder 24 may be constructed from standard digital circuitry. Logic gate 25 is a standard digital logic gating circuit providing an output on lead 29 (Note: lead 29 contains three lines, coupling gate 25 to register 20, counter 22 and inverter 26.) An input of gate 25 is coupled to register 20 by lead 27 and to decoder 27 by lead 28. Gate 25 provides an output if, and only if, both inputs (leads 27 and 28) are false or "zeros." The output from gate 25 is coupled to counter 22, register 20 and inverter 26 by lead 29. Inverter 26 provides an output on lead 31 whenever the input (lead 29) does not provide a signal to inverter 26. Inverter 26 may be made from standard digital circuitry commonly known in the computer art. The operation of the converter will be explained after the description of FIG. 8.

Referring to FIG. 8, the characteristic component of the log-analog output signal is developed within the resistive network enclosed by doted line 38. Resistors 41 through 45 inclusive are coupled in series with switches $C_{10}$ through $C_{50}$ respectively. Resistors 41 through 45 are standard resistive elements, and switches $C_{10}$ through $C_{50}$ may be any one of commonly utilized electrical switching means. Resistors 41 through 45 with the series coupled switches $C_{10}$ through $C_{50}$ respectively are connected in parallel. One junction of this parallel combination is coupled to battery 40. Battery 40 is a standard source of electrical energy for providing a constant voltage to the circuit of FIG. 8. The other junction of this parallel combination is coupled to input lead 66 of amplifier 63.

The mantissa component for the output log-analog signal is developed within the resistive network contained within dotted line 39. Resistors 51 through 60 inclusive (Note: resistors 54 through 59 are not shown in FIG. 8) are each coupled in series with switching means $M_{10}$ through $M_{100}$ respectively. Resistors 51 through 60 and switching means $M_{10}$ and $M_{100}$ are standard electrical devices similar to those used in conjunction with the circuit contained within dotted line 38. Resistors 51 through 60 with their series coupled switches are connected in parallel. One junction of this parallel combination is coupled to resistor 61 and switch 62. The other junction of the parallel combination is coupled to the positive terminal of battery 40. Resistor 61 may be any of the standard electrical resistors and is coupled to lead 66. Switch 62 is a standard electrical or solid state switch as described in conjunction with switches $C_{10}$ through $C_{50}$. The switch 62 is coupled across resistor 61. Note that if a more rigorous determination of the mantissa is required additional resistors such as resistors 51 through 60 and switches such as switches $M_{10}$ through $M_{100}$ may be utilized in conjunction with additional output signals from register 20 such as would be provided on leads $M_{11}$ through $M_{31}$ (not illustrated).

The current representative of the characteristic and mantissa components of the log-analog signal are summed at circuit junction 67 and sensed by amplifier 63. Amplifier 63 is a standard operational amplifier commonly known and utilized in the computer art. The input to amplifier 63 is lead 66 and the output is lead 65. A feedback resistor 64, coupled between the input and output leads 66 and 65 respectively, of amplifier 63 provides feedback for amplifier 63. The input impedance to amplifier 63 is approximately zero ohms. Therefore, virtually no impedance exists between lead 66 and electrical ground.

The output leads from counter 22, (FIG. 7) $C_1$ through $C_5$ are coupled to the actuating leads of switches $C_{10}$ through $C_{50}$ respectively. Switching means $C_{10}$ through $C_{50}$ complete the circuits shown for their respective switches when a "one" is present on leads $C_1$ through $C_5$. In the same manner, leads $M_1$ through $M_{10}$ of register 20 are coupled to the actuating leads of switches $M_{10}$ through $M_{100}$, respectively. When a "one" is indicated at the leads $M_1$ through $M_{10}$ the respective switch of $M_{10}$ to $M_{100}$ closes, completing the electrical path containing each switch. Thus, by way of example, if the output of counter 22 indicated the numerical value 2 a "one" would be present on lead $C_4$ and leads $C_1$, $C_2$, $C_3$ and $C_5$ would indicate "zeros." In this case, only switch $C_{40}$ would be closed, switching means $C_{10}$, $C_{20}$, $C_{30}$ and $C_{50}$ would remain open as they are shown in FIG. 8. Similarly, if $M_1$ through $M_{10}$ indicated "ones" on leads $M_1$ and $M_2$, and leads $M_3$ through $M_{10}$ contained "zeros," only switches $M_{10}$ and $M_{20}$ would be closed while switches $M_{30}$ through $M_{100}$ would be open.

Switching means S31 is a switch which may be similar to switching means $C_{10}$ through $C_{50}$. The actuating lead of switching means S31 is coupled to lead 31 (FIG. 7). Where a "one" appears on lead 31, switch S31 closes. Switch S31 is coupled to the output of amplifier 63 and output terminal 70.

The choice of the value of resistors 41 through 45, 51 through 60 and resistor 61 may be determined in accordance with the criteria described in this paragraph. The absolute value of these resistors is not of significance and therefore only their relative values are discussed. Assuming switches $C_{10}$ through $C_{50}$ and $M_{10}$ through $M_{100}$ are closed, current $i_2$ should be approximately 31 times as great as current $i_3$. (Note: if an infinite number of resistors and bits is used in the determination of mantissa $i_2$ would be 31 times as great as $i_3$. In the present embodiment $i_3$ approaches 1/31 $i_2$ by the same rate that ½ + ⅓ + ¼ ... +1/10 approaches 1.) From this current relationship the relative values of the parallel combination of resistors 41 through 45 and resistors 51 through 60 and resistor 61 may be determined. In addition, resistor 44 should have one-half the resistance of resistors 45 and resistors 43 should have one-half the value of resistor 44, and so on, so that resistor 41 has one-sixteenth the resistance of resistor 45. Similarly, for resistors 51 through 60, resistor 52 should have twice the resistance of resistor 51, resistor 53 should have twice the resistance of resistor 52 and so on.

The choice of the value for resistance 61 in this embodiment is of importance in the converter. This significance can best be illustrated by reference to the circuit of FIG. 1. The circuit of FIG. 1 is analogous to the circuit enclosed by dotted line 39 of FIG. 8. Resistor 61 of FIG. 8 is represented by the resistor R having a conductance G. Resistors 51 through 60 of FIG. 8 are represented by resistor $r$ with conductance of $g$ in FIG. 1. The variable resistance shown in FIG. 1 is obtained by actuating switches $M_{10}$ through $M_{100}$ of FIG. 8.

Figure 3:
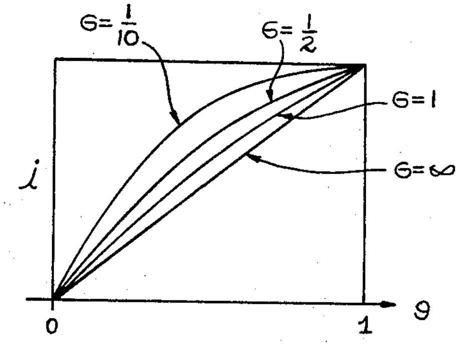
FIG. 3 is a graph of the current ($i$) versus conductance ($g$) for various values of G for the circuit of FIG. 1.

In FIG. 3, the current $i$ is shown for various values of $G$ in the range for $0 \leq g < 1$. It is quite apparent that the shape of the curve representing $i$ or the mantissa of the logarithm can be varied by changing the value of $G$. The value of $G$ will depend on the criteria chosen for determining the closeness between the actual logarithmic curve and the curves shown in FIG. 3. For example, if "smoothness" is the chosen criteria, then the slope at $g = 0$ must equal twice the slope at $g = 1$. (This occurs since the range $0 \leq g < 1$ corresponds to an octave.) The chosen criteria is shown mathematically by $$\left[\frac{di}{dg}\right]_{g=1} = \frac{1}{2}\left[\frac{di}{dg}\right]_{g=0}$$

in $G = 1 + \sqrt{2}$. (Note: This criteria also yields zero error at the geometric means of an octave span ($G = \sqrt{2} - 1$), as well as satisfying the slope conditions at $g = 1$ and $g = 0$). Thus, the error that results from determining the mantissa utilizing the resistive network may be minimized in various ways. It is obvious that other criteria may be chosen and $G$ fixed to minimize error in other ways.

Resistor 61 is in series with battery 40 as is illustrated in FIG. 8. It may be expedient in a particular application for the resistance of resistor 61 to consist, entirely or partly, of the internal resistance of battery 40. Thus, a normally undesirable property of a typical battery may be utilized. The disclosed coverter is therefore not as dependent on perfect voltage sources as are many other converters.

Referring to FIGS. 7 and 8, the operation of the converter may be readily understood. Initially, an input word is applied to register 22 through leads $I_1$ through $I_{32}$ inclusive, the most significant bit being applied at $I_1$ and the least significant bit at $I_{32}$. It is, of course, the object of the present invention to convert this digital word into a log-analog signal. A start signal is applied to counter 22 and register 20 on lead 30. On receipt of this signal, register 20 accepts the 32 bit word and counter 22 sets its output at the maximum count, that is all "ones" on leads $C_1$ to $C_5$.

When the input word is initially accepted into register 20, the output $M_0$ which is coupled to lead 27 indicates whether or not the most significant bit position $I_1$ of the input word contains a "one" or a "zero." If a zero is indicated on lead 27, ( and lead 28 also indicates a "zero") gate 25 produces an output signal on lead 29. This signal is applied to register 20 and counter 22. The signal causes register 20 to shift the input word by one bit (to the left). That is, bit $I_2$ of the original input word is transferred to the place in the register corresponding to $M_0$ and $I_3$ to the place corresponding to $M_2$, and so on. The signal applied to counter 22 causes counter 22 to indicate a digital binary number 1 less than the preceding digital number. That is, $C_1$ through $C_4$ will contain all "ones" and $C_5$ a "zero." This corresponds to the numerical number 30. The input word will be continually shifted in register 20 and counter 22 will continue decrementally counting until a valued bit that is a "one" is received by gate 25 through lead 27 or a "one" is received on lead 28. When this occurs, gate 25 does not put out a signal. This prevents shifting the word in register 20 and prevents counter 22 from decrementing. Thus, the output of counter 22 is a digital signal having a value equal to the value of the most significant valued bit of the input digital signal.

When inverter 26 does not receive a signal, it puts out a signal on lead 31. When a signal appears on lead 31, switch S31 closes and the output signal from amplifier 63 is coupled to output terminal 70, indicating that the conversion is completed. The output of amplifier 63 is representative of the current, $(i_2 + i_3)$. The current $i_2$ represents the characteristic component of the log-analog signal and the current $i_3$ represents the mantissa component of the log-analog signal. The sum of the currents, therefore, represents the total log-analog signal. Thus, the log-analog conversion of the input word appears on terminal 70.

In the case where the input word consists of all zeros, the shifting will continue in register 20 until counter 22 reaches the count of 0. When all "zeros" appear on leads $C_1$ through $C_5$, decoder network 24 produces a signal on lead 28. This signal in conjunction with the zero on lead 27 causes gate 25 not to produce a signal on lead 29. This is the same as if a "one" had appeared on lead 27 and a zero were present on lead 28. Thus, in this situation, when a signal appeared on lead 27, switches $C_{10}$ through $C_{50}$ and $M_{10}$ through $M_{100}$ would remain open. The purpose of this feature is to stop the shifting in register 20. Note: the converter does not convert a zero digital value since the $\log_2 0 = -\infty$ ; although an arbitrarily large negative value could be generated upon the detection of this condition.

It should be recognized that the circuit contained in dotted line 38 of FIG. 8 is a standard converter for converting digital information to linear analog form. In addition, the circuit contained within dotted line 39, with the exclusion of resistor 61, would also be a standard linear digital to analog converter.

Thus, by eliminating resistor 61 from the circuit of FIG. 8, the resultant circuit can be used for converting digital information to linear analog form. Switch 62 has been provided to electrically eliminate resistor 61 from the circuit. Thus, by closing switch 62, the circuit contained within dotted line 39 becomes a standard linear digital to analog converter.

The present embodiment of the invention has been disclosed using resistors means for resistors 41 through 45 and 51 through 60 and resistor 61. Note: any linear circuit elements may be used in these applications in accordance with the teachings of this invention. For example, resistors 41 through 45 or 51 through 60 and resistor 61 may be replaced with inductors. If this were done, the inductors would be driven by an alternating current source instead of battery 40. Similarly, linear solid state devices could be used.

Figure 4:
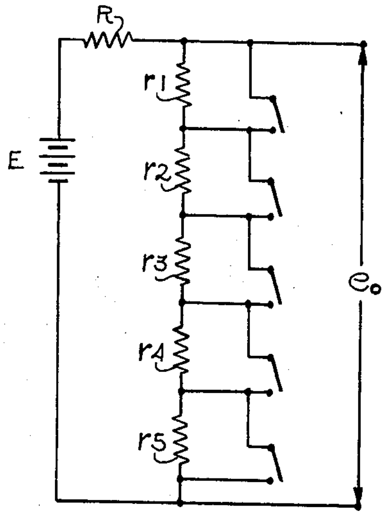
FIG. 4 is a series resistive network.
Figure 5:
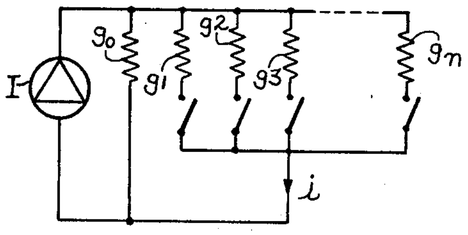
FIG. 5 is a parallel resistive network, with resistance specified in terms of conductance.

FIG. 4 illustrates a series resistive network with resistors $r_1$ through $r_5$ each paralleled by a switch. The circuit shown at FIG. 7 and enclosed by dotted line 39 may be replaced with a circuit shown in FIG. 4. If this were done, summing amplifier 63 would sum two voltages one representing the mantissa component and the other representing the characteristic component of the log-analog signal. Resistance R of FIG. 4 would be equivalent to resistor 61 of FIG. 8. Resistances $r_1$ through $r_5$ would be calculated to achieve the same results as was obtained using resistors 51 through 60 of FIG. 8. FIG. 5 illustrates another circuit that could replace the circuit enclosed by dotted line 39 of FIG. 8. In FIG. 5, constant current source I supplies current to the parallel resistors with conductance values $g_0$ through $g_n \cdot g_0$ would perform the equivalent function as resistor 61 of FIG. 39 and $g_1$ through $g_n$, each containing a series switch, would be equivalent to resistors 51 through 60. It is obvious from FIGS. 4 and 5 that the circuit shown within dotted line 39 of FIG. 7 may be replaced with other resistive networks by utilizing well known circuit theorems for developing equivalent circuits.

Figure 6:
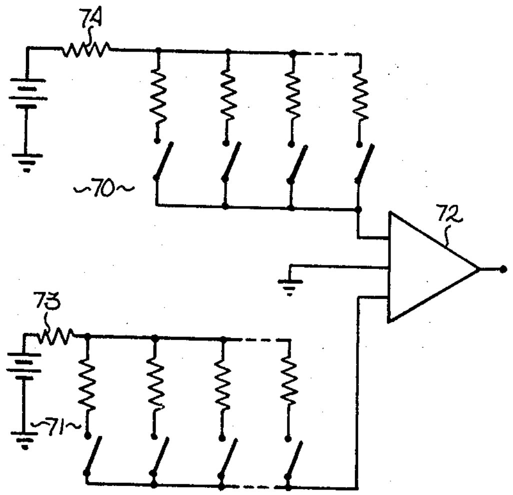
FIG. 6 illustrates two resistive networks and a summing amplifier.

FIG. 6 illustrates two circuits (70 and 71) similar to that enclosed by dotted line 39 of FIG. 8, each coupled to summing amplifier 72. The current flow from circuit 70 and 71 is summed in amplifier 72 and the output signal from amplifier 72 would be representative of the sum of said currents. This entire circuit could be used to replace the circuit shown within dotted line 29 of FIG. 7. As is illustrated in FIG. 3, by selecting various values for fixed resistor G of FIG. 1, the shape of the curve which is representative of the response of the circuit may be varied. Resistors 73 and 74 of FIG. 6 serve the same function as resistor R of FIG. 1 and resistor 61 of FIG. 7. Thus, in FIG. 6, by choosing different values for resistors 73 and 74, the response of circuit 70 may be added or substracted to the response of circuit 71. This would allow more complex criteria to be used in determining the closeness of the curve represented by circuits 70 and 71 to the logarithmic curve. In addition, the disclosed concept may be used to approximate curves other than the logarithmic curve herein discussed.

The resistor in the networks illustrated in FIGS. 4, 5 and 6 may be replaced with any linear circuit element such as linear solid state circuit means, inductors or capacitors. If inductors or capacitors are utilized, an alternating source of electrical energy would be utilized in place of the direct current source illustrated.

The resistive networks illustrated in FIGS. 4, 5, 6 and 8 which are utilized to produce the analog signal for the mantissa and characteristic of the logarithmic signal may be replaced by R–2R ladder networks. The use and design of such networks are discussed in *Digital-To-*Analog Conversion Ladders, Electro-Technology, November, 1964 by Allan A. Arthur and *Ladder Networks are Easy to Design*, Electronic Design 14, July 5, 1967 by Jay Freeman. The advantages of these networks are discussed in these articles and include the fact that the equivalent resistance for the ladder at any node of the ladder is always R, this value being independent of the number of stages in the network.

Figure 9:
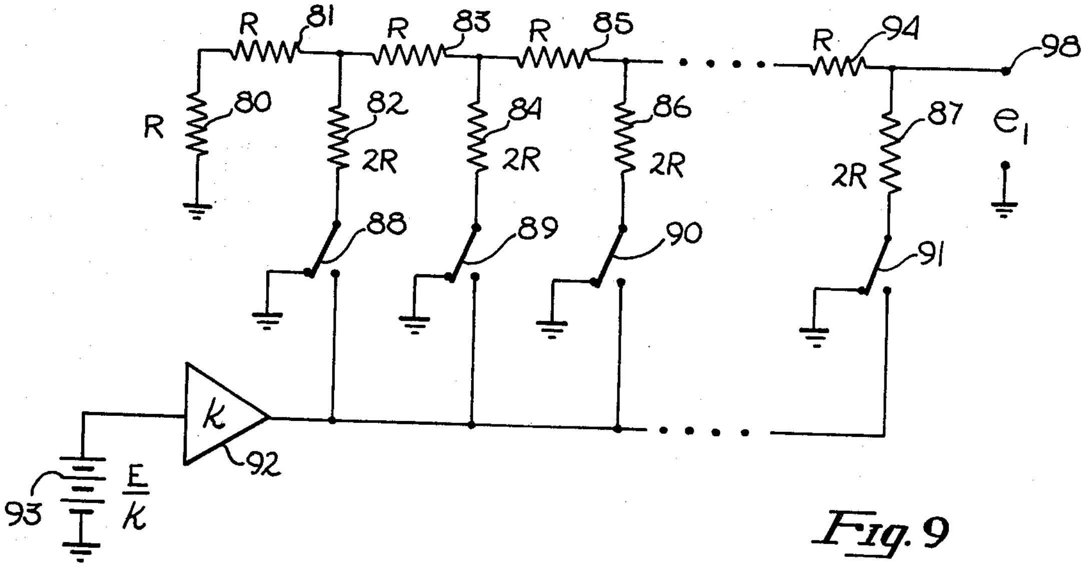
FIG. 9 is an alternate embodiment of a circuit for determining the characteristic value utilizing an R–2R ladder.

Referring to FIG. 9 a network which may be utilized as a portion of the digital to log-analog converter for determining the characteristic of the analog signal is illustrated. This network may be utilized in lieu of the network illustrated in FIG. 8 within the dotted line 38. The network of FIG. 9 is not a direct replacement for the network of 38 since the circuit illustrated in FIG. 8 is designed to sum currents while the output of the circuit illustrated in FIG. 9 is a voltage $e_1$ at terminal 98. It will be obvious to one skilled in the art that the portion of the circuit in FIG. 8 utilized to sum currents may be readily modified in order to sum voltages such as the voltage $e_1$ at terminal 98.

The R–2R ladder illustrated in FIG. 9 comprises a series of stages each of which includes a resistor having a fixed or constant resistance R, a second resistor having a fixed or constant resistance 2R and a single throw, double pole switch. One such stage is illustrated in FIG. 9 as resistor 81 which is connected to resistor 82, resistor 82 being in series with a single throw double pole switch 88. One end of resistor 81 is coupled to ground through resistor 80, said resistor having a resistance of R. Another stage of the R–2R ladder is illustrated comprising resistor 83, resistor 84 and switch 89. This stage may be identical to the previously described stage with resistor 83 coupled to the other end of resistor 81. An additional stage of the ladder comprises resistors 85 and 86 and switch 90. This stage may be identical to the previously discussed stages. The ladder may contain any number of stages as indicated by the dotted lines which are coupled to the final stage comprising resistor 94 having the value R resistor 87 having a value of 2R and a single throw, double pole switch 91. The value of the resistors R and 2R may be selected or described in the above reference articles.

The terminal 98 is coupled to one end of resistor 94 and the output voltage $e_1$ is sensed between the terminal 98 and ground. Each of the switches 88, 89, 90 and 91 may be ordinary solid state or mechanical switches adaptable for coupling a resistor 2R either between ground potential or to a lead which is coupled to the output of amplifier 92.

A voltage supply 93 providing a constant voltage having a value $E/k$ is coupled to the single throw, double pole switches through an operational amplifier 92 having a constant gain $k$. Thus, the voltage applied to each of the resistors 2R of the ladder network when the switches 88, 89, 90 or 91 coupled that resistor to the operational amplifier 92 is E. The operational amplifier 92 and the voltage supply 93 may be commonly utilized components.

The circuit of FIG. 9 is utilized in the same manner as the circuit of FIG. 8 contained within the dotted line 38 is utilized, in that the switches 88 through 91 are actuated by the signals which appear on leads $C_1$ through $C_5$ of the counter 22 (FIG. 7). Thus, if a "1" appears on lead $C_1$ the switch 91 would be in a position such that resistor 87 would be connected to amplifier 92. If no signal appeared on lead $C_{11}$ that is a "zero" digital bit, then switch 91 would be connected through resistor 87 to ground. The number of stages contained within the R–2R ladder would correspond to the number of output signals from counter 22 for example in the embodiment illustrated in FIG. 7 there would be five stages corresponding to the leads $C_1$ through $C_5$.

Figure 10:
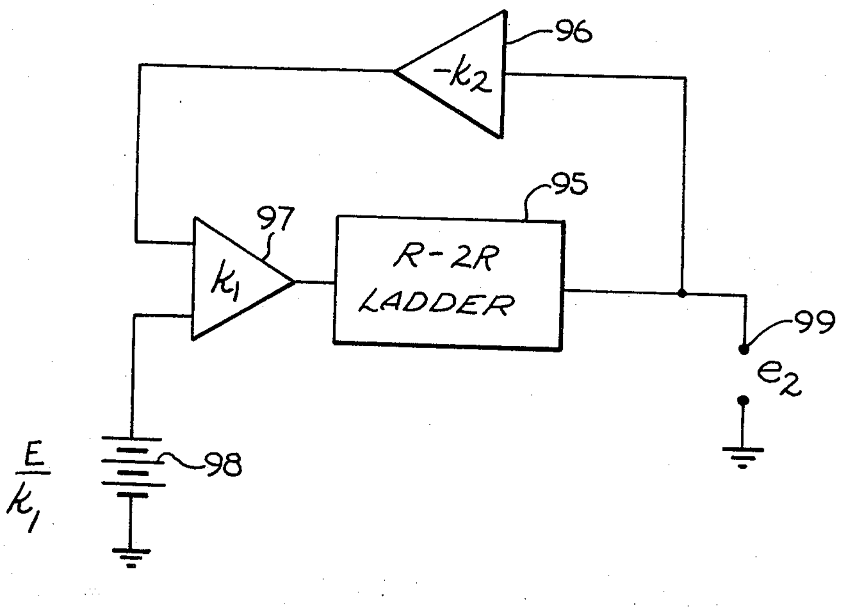
FIG. 10 is an alternate embodiment of a circuit for determining the mantissa value utilizing an R–2R ladder.

It is also possible to utilize an R–2R ladder network to determine the mantissa component of the analog signal. A circuit which utilizes an R–2R ladder for obtaining the mantissa is illustrated in FIG. 10. This circuit may be utilized to replace the circuit contained within the dotted line 39 of FIG. 8. Once again the fact that the summing network shown in FIG. 8 sums currents rather than voltages must be taken into consideration and appropriately modified so that it may sum the voltage $e_2$ shown in FIG. 10 with the voltage $e_1$ of FIG. 9. The circuit shown in FIG. 10 may be utilized in the embodiments previously discussed and illustrated in FIGS. 4, 5 and 6.

In FIG. 10 an R–2R ladder network which may be similar to the one described in conjunction with FIG. 9 is illustrated as ladder 95. The output from the ladder is coupled to terminal 99, the terminal at which the output voltage $e_2$ is produced. The output from the ladder 95 is also coupled to the input of an amplifier 96, having a constant gain of a $-k_2$. The output of amplifier 96 is coupled to the input of amplifier 97. A voltage source illustrated as battery 98 providing a constant voltage $E/k_1$ is also coupled to the input of amplifier 97. Amplifier 97 sums the two inputs, that is the voltage $elk_1$ and the output from amplifier 96, and multiplies this sum by the gain of amplifier 97 $k_1$. The output from the amplifier 97 is applied to the ladder 95 in the same way that the output from amplifier 92 of FIG. 9 is applied to the ladder illustrated in that figure. Amplifiers 96 and 97 may be ordinary operational amplifiers, commonly known in the art.

To utilize the circuit illustrated of FIG. 10, in the circuit of FIG. 8, the switches which form a part of the R–2R ladder 95 would be coupled to the leads $M_1$ through $M_{10}$ illustrated as the outputs of register 20, FIG. 7 and signal appearing on these leads would actuate the switches in the ladder 95 in the same manner as discussed in conjunction with FIG. 9. For example, if a "1" appeared on lead $M_1$ it would actuate one of the switches within ladder 95 such that a resistor having a value of 2R would be coupled to the output of amplifier 97. An operational amplifier may be utilized to sum the voltages $e_1$ and $e_2$ these being the output voltages from the R–2R ladder illustrated in FIGS. 9 and 10 respectively. The sum of these voltages which would be an analog signal, would be proportional to the logarithm of the input digital signal applied to the lead $i_1$ through $i_{32}$ of FIG. 7.

As previously discussed in conjunction with FIGS. 1, 2 and 3 the non-linearity utilized to determine the mantissa component of the analog signal was produced with the use of a resistor R having a conductance $1/G$, as illustrated in FIG. 1. It was previously shown that $i = Kg/(G+g)$ for FIG. 1 where $K$ and $G$ are constance and where $g$ represents the variable resistance produced by the addition of resistors to the networks illustrated in FIGS. 4, 5, 6 and 8. It can be shown that the transfer function for the circuit illustrated in FIG. 10 is equal to $aH/(b+H)$ where $H$ is a variable and a function of the positions of the single throw, double pole switches in the R–2R ladder 95, $a = 1/k_2$ and $b = 1/(k_1,k_2)$. It is readily apparent that the form of the transfer function for the circuit of FIG. 10 is identical to the form of the equation for the circuit of FIG. 1. In selecting the values for $k_1$ and $k_2$ the various criteria previously discussed for the selection of the resistor R of FIG. 1 or the resistor 61 of FIG. 8 may be utilized. Additionally, two circuits such as the one shown in FIG. 10 may be utilized in the configuration illustrated in FIG. 6 in place of the circuits 70 and 71 to more accurately determine the mantissa component. Thus, it is possible to construct the entire digital to log-analog converter as illustrated in FIG. 8 with R–2R ladders.

Thus, by the use of linear networks, the non-linear logarithmic curve has been approximated. This approximation has been utilized in the present invention to produce the log-analog conversion of a digital word. The accuracy of the converter is determined by the number of networks (such as that shown within dotted line 39 of FIG. 7) which are used in determining the mantissa component of the log-analog signal. For example, in FIG. 6 two such networks are shown. Any number of such networks may, of course, be used. In addition, the output log-analog signal may be used to exactly fit the logarithms function for a given mathematical criteria such as "smoothness." Although this invention has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. A digital to analog converter for converting a digital signal representative of a number to an analog logarithmic function of that number comprising:

a register for receiving said digital signal;

digital counting means coupled to said register for determining the value N−1 where N is equal to the number of bit positions in said digital signal up to and including the most significant valued magnitude bit in said signal and for providing an output digital signal representative of said value;

a digital to analog converter for converting said output digital signal representative of said value to an analog signal representative of said value, said analog signal being representative of the characteristic of said analog logarithmic function;

a non-linear digital to analog converter for providing an analog output signal representative of the mantissa of said analog logarithmic function, said non-linear digital to analog converter being actuated only by bits of said input digital signal of lesser significance than said most significant valued bit;

combining means for combining said analog signals representative of said characteristic and mantissa to provide said analog logarithmic function.

2. The converter defined in claim 1 wherein said non-linear digital to analog converter includes an R–2R ladder network.

3. A digital to analog converter for converting an input digital signal to an output analog signal where said output analog signal is a logarithmic function of a number representable by said input digital signal comprising:

a register for receiving said input digital signal;

a digital counting means coupled to said register for determining the value N−1 where N is equal to the number of bit positions in said digital signal up to and including the most significant valued magnitude bit in said digital signal and for providing an output digital signal representative of said value;

a digital to analog converter for converting said output digital signal representative of said value to an analog signal representative of said value, coupled to said counting means;

a network comprising a plurality of switches and resistors having a non-linear analog output signal representative of the mantissa of said logarithmic function when said switches are actuated, said switches being coupled to and actuated only by bits of said input digital signal of lesser significance than said most significant valued bit;

combining means for combining said analog signal representative of said valve and said non-linear analog output signal coupled to said network and said digital to analog converter for providing said output analog logarithmic function of said input digital signal.

4. A digital to analog converter for converting a digital signal to an analog signal having a magnitude which is a logarithmic function of said digital signal comprising:

a register for receiving said digital signal;

digital counting means coupled to said register for determining the value N−1 where N is equal to the number of bit positions in said digital up to and including the most significant valued magnitude bit in said signal and for providing an output digital signal representative of said value;

a digital to analog converter for converting said output digital signal representative of said value to an analog signal representative of said value coupled to said counting means;

a plurality of switches coupled to and actuated only by digital signals in said register which are of lesser significance than the said most significant valued bit;

a resistive network comprising a plurality of resistors each coupled to at least one of said switches;

a source of electrical energy coupled to said resistive network;

a resistor coupled to said source of electrical energy and said resistive network, said resistor being coupled such that its resistance in combination with the resistance of any alternately selected resistors of said resistive network produce a non-linear output analog signal representative of the mantissa of said logarithmic function from said resistive network;

combining means for combining said analog signal from said digital to analog converter with the output analog signal from said resistive network whereby the output from said combining means is an analog signal representative of a logarithmic function of said digital signal.

5. The converter defined in claim 4 wherein the value of said resistor is a constant, said value being such that when said resistor is alternately combined with said resistive network said non-linear output signal approximates a logarithmic function.

6. The converter defined in claim 5 wherein said combining means adds said analog signal from said digital to analog converter with the output analog signal from said resistive network.

7. The converter defined in claim 4 wherein a plurality of the circuits comprising said plurality of switches, said resistive network and said resistor are coupled to said register and said combining means combines the outputs from said plurality of circuits with said analog signal from said digital to analog converter.

8. The converter defined in claim 4 wherein said digital to analog converter comprises a resistive network and a plurality of switches.

9. The converter defined in claim 4 wherein said resistive network includes an R–2R ladder network.

10. A digital to analog converter for converting a digital signal representative of a number to an analog output signal which is a logarithmic function of that number comprising:

a register for receiving said digital signal;

digital counting means coupled to said register for determining the value N−1 where N is equal to the number of bit positions in said digital signal up to and including the most significant valued magnitude bit in said digital signal and for providing an output digital signal representative of said value;

a digital to analog converter for converting said signal representative of said value to an analog signal representative of said value coupled to said counting means;

an R–2R ladder network comprising a plurality of resistors and a plurality of switches, said switches coupled to and actuated only by digital signals in said register which are of lesser significance than said most significant valued bit to produce an output representative of the mantissa of said logarithmic function; said network having at least an input and output terminal;

a source of electrical energy;

a first combining means for combining two input signals and for producing an output signal representative of said two input signals, one input coupled to said source of energy and said output coupled to said input terminal of said ladder network;

an amplifier having an input and output, said output coupled to said input of said first combining means and said input coupled to said output terminal of said ladder network.

a second combining means for combining the output of said ladder network with said output from said digital to analog converter whereby the output of said combining means is an analog signal the magnitude of which is a logarithmic function of the number represented by said digital signal.

* * * * *